US009295018B1

(12) United States Patent
Ruffini et al.

(10) Patent No.: US 9,295,018 B1
(45) Date of Patent: Mar. 22, 2016

(54) COMMUNICATION NETWORK NODES AND METHODS PERFORMED THEREIN

(71) Applicant: Telefonaktiebolaget L M Ericsson (publ), Stockholm (SE)

(72) Inventors: Stefano Ruffini, Rome (IT); Mats Forsman, Ronninge (SE); Tomas Thyni, Jarfalla (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/420,969

(22) PCT Filed: Dec. 17, 2014

(86) PCT No.: PCT/SE2014/051518
§ 371 (c)(1),
(2) Date: Feb. 11, 2015

(51) Int. Cl.
*H04W 56/00* (2009.01)
*H04L 7/00* (2006.01)
*H04W 84/04* (2009.01)

(52) U.S. Cl.
CPC ......... *H04W 56/0015* (2013.01); *H04L 7/0008* (2013.01); *H04W 84/042* (2013.01)

(58) Field of Classification Search
CPC .. H04B 7/0008; H04B 7/0033; H04B 7/0037; H04B 7/0041; H04B 7/0337; H04W 56/001; H04W 56/0015; H04W 56/0025; H04W 56/0035; H04W 56/004; H04W 56/0055; H04W 84/00; H04W 84/02; H04W 84/04; H04W 84/042; H04W 84/045; H04W 84/20; H04W 84/22
USPC .......... 375/354, 356; 370/337, 338, 342, 344, 370/350; 455/456.5, 13.2, 524, 525
See application file for complete search history.

(56) References Cited

U.S. PATENT DOCUMENTS

2006/0034250 A1  2/2006  Kim et al.
2007/0266119 A1* 11/2007  Ohly .................... H04J 3/0664
                                                       709/220

(Continued)

FOREIGN PATENT DOCUMENTS

EP    2148459 A1    1/2010
EP    2352261 A1    8/2011

(Continued)

OTHER PUBLICATIONS

3GPP TS 36.101 V12.3.0: "Evolved Universal Terrestrial Radio Access (E-UTRA); User Equipment (UE) radio transmission and reception", *3rd Generation Partnership Project; Technical Specification Group Radio Access Network*; (Release 12), (Mar. 2014), 510 pages.

(Continued)

*Primary Examiner* — Young T Tse
(74) *Attorney, Agent, or Firm* — Nicholson Devos Webster & Elliott LLP

(57) ABSTRACT

A synchronization module is associated with a network node of a communication network which comprises at least one Synchronization Master entity. The synchronization module has knowledge of a plurality of Synchronization Master references. Endpoints of paths of the plurality of Synchronization Master references are obtained. Each of the paths extends between one Synchronization Master Entity and the first or the second access network node. The paths are obtained from a synchronization report module based on the obtained endpoints. For each of the Synchronization Master references, a first path and a second path of the obtained paths are selected. A time synchronization inaccuracy value between the first and the second access network node is calculated based on the selected paths. A Synchronization Master reference is selected based on the calculated time synchronization inaccuracy values, and the first and the second access network node are notified which Synchronization Master reference was selected.

21 Claims, 8 Drawing Sheets

(56) References Cited

U.S. PATENT DOCUMENTS

| | | | |
|---|---|---|---|
| 2009/0245228 A1* | 10/2009 | Osterling | H04J 3/0638 370/350 |
| 2012/0036277 A1* | 2/2012 | Stokking | H04N 7/24 709/231 |
| 2012/0250704 A1 | 10/2012 | Yamada et al. | |
| 2012/0324520 A1* | 12/2012 | Van Deventer | H04L 65/605 725/109 |

FOREIGN PATENT DOCUMENTS

| | | |
|---|---|---|
| WO | 2007102749 A1 | 9/2007 |
| WO | WO-2012/048975 | 4/2012 |

OTHER PUBLICATIONS

3GPP TS 36.133 V12.4.0: "Evolved Universal Terrestrial Radio Access (E-UTRA); Requirements for support of radio resource management", *3rd Generation Partnership Project; Technical Specification Group Radio Access Network*; (Release 12). (Jul. 2014), 870 pages.

3GPP TS 36.305 V12.1.0: "Evolved Universal Terrestrial Radio Access Network (E-UTRAN); Stage 2 functional specification of User Equipment (UE) positioning in E-UTRAN", *3rd Generation Partnership Project; Technical Specification Group Radio Access Network*; (Release 12), (Jun. 2014), 59 pages.

IEEE Std 802.1AS™-2011: "Timing and Synchronization for Time-Sensitive Applications in Bridged Local Area Networks", *IEEE Standard for Local and metropolitan area networks*, (Mar. 30, 2011), 292 pages.

IEEE Std 1588-2008: *IEEE Standard for a Precision Clock Synchronization Protocol for Networked Measurement and Control Systems*, (Revision of IEEE Std 1588-2002), (2008), 1-269.

ITU-T G.8271/Y.1366: "Time and phase synchronization aspects of packet networks", *Series G: Transmission Systems and Media, Digital Systems and Networks: Packet over Transport aspects—Quality and availability targets; Series Y: Global Information Infrastructure, Internet Protocol Aspects and Next-Generation Networks: Internet protoco*, (Feb. 2012), 32 pages.

ITU-T G.8271/Y.1366: "Time and phase synchronization aspects of packet networks, Amendment 1", *Series G: Transmission Systems and Media, Digital Systems and Networks: Packet over Transport aspects—Quality and availability targets; Series Y: Global Information Infrastructure, Internet Protocool Aspects and Next-Generation Networks; Internet protoco*, (Aug. 2013), 12 pages.

ITU-T G.8271.1/Y.1366.1: "Network limits for time synchronization in packet networks", *Series G: Transmission Systems and Media, Digital Systems and Networks: Packet over Transport aspects—Quality and availability targets; Series Y: Global Information Infrastructure, Internet Protocol Aspects and Next-Generation Networks*, (Aug. 2013), 33 pages.

ITU-T G.8271.1/Y.1366.1: "Network limits for time synchronization in packet networks, Amendment 1", *Series G: Transmission Systems and Media, Digital Systems and Networks: Packet over Transport aspects—Synchronizationm quality and availability targets; Series Y: Global Information Infrastructure, Internet Protocol Aspects and Next-Generation Networks*, (May 2014), 18 pages.

Li, et al., "IS-IS Extentions for Traffic Engineering", *RFC* 5305; (Oct. 2008), 17 pages.

Invitation to Pay Additional Fees, Application No. PCT/SE2014/051518, dated Sep. 18, 2015, 5 pages.

International Search Report and Written Opinion, Application No. PCT/SE2014/051518, dated Oct. 16, 2015, 18 pages.

* cited by examiner

Fig. 1 (existing art)

COMMUNICATION NETWORK NODES AND METHODS PERFORMED THEREIN

CROSS-REFERENCE TO RELATED APPLICATIONS

This application is a National stage of International Application No. PCT/SE2014/051518, filed Dec. 17, 2014, which is hereby incorporated by reference.

TECHNICAL FIELD

This description relates generally to time or phase synchronisation in communication networks. Particularly, it relates to reduction of time or phase synchronisation inaccuracy of access network nodes in packet switched networks.

BACKGROUND

For an increasing amount of services in communication networks, wireless communication devices are communicatively connected to more than one radio base station. For instance, when determining a geographic location of a wireless communication device, reference signals from multiple radio base stations are used.

In communication networks which applies LTE (Long Term Evolution) based radio access technologies, accurate time and phase alignment of the internal clock is important. Time and phase synchronization is required for LTE-TDD (Time Division Duplex) many LTE-FDD (Frequency Division Duplex) coordination features e.g. for joint transmission, a wireless communication device receives data from multiple cells or multiple RBSs (Radio Base Stations), which offers better performance, but puts harder requirements on synchronization. In packet synchronisation networks, a major problem for synchronization protocols is the variance in the send time, access time, propagation time, and the receive time.

From the infrastructure perspective, mobile operators have a broad range of topologies to support. The physical network using different technologies such as microwave, fibre and copper wire will enable/limit different capabilities and characteristics. These differences in physical transport and in the different types of topologies, creates delay and delay variation that is unpredictable.

One solution for synchronising internal clocks in communication network is to distribute PTP (Precision Time Protocol) messages from a Grandmaster entity, which in generally is located centralised in the communication network, to PTP-clients at each cell site. The PTP protocol distributes PTP messages from a Grandmaster entity to transport network nodes and access network nodes who update their internal clocks based on the received time information in order to stay synchronized. A PTP system is a distributed, networked system consisting of a combination of PTP and non-PTP devices. PTP systems include a grandmaster entity, boundary clocks, and transparent clocks. Often the Grandmaster entity is located in a centralized part of the network; causing PTP messages to travel multiple hops. A boundary clock has multiple network connections and can accurately bridge synchronization from one network segment to another. A synchronization master is selected for each of the network segments in the system. The root timing reference is called the Grandmaster clock. The Grandmaster entity transmits synchronization information to the clocks that are in its network segment. The boundary clocks with a presence on that segment then relay accurate time to the other segments to which they are equally connected. The transparent clock modifies PTP messages by including appropriate timestamps as they pass through the device. The Timestamps in the PTP messages are compensated for time spent traversing the network and equipment e.g. (switch/router).

The term "wireless communication device" will be used throughout this description to denote any device which is capable of wireless communications. The term wireless communication device may thus include any device, which may be used by a user for wireless communications. Accordingly, the term wireless communication device may alternatively be referred to as a mobile terminal, a terminal, a user terminal (UT), a user equipment (UE), a wireless terminal, a wireless communication device, a wireless transmit/receive unit (WTRU), a mobile phone, a cell phone, a table computer, a smart phone, etc. Yet further, the term wireless communication device includes MTC (Machine Type Communication) devices, which do not necessarily involve human interaction. MTC devices are sometimes referred to as Machine-to-Machine (M2M) devices.

With reference to FIG. 1, which is a schematic overview, a scenario where a wireless communication device 100 is served by multiple access network nodes 102, 104 will now be described.

In this example the communication network node is communicatively connected via an LTE (Long Term Evolution) access network to a first radio base station 102 and a second radio base station 104. In the figure respective coverage areas of the radio base stations 102, 104 are illustrated as two ovals. The first radio base station 102 is set to be a master for a coordination function such as FeICIC (Further enhanced Inter-Cell Interference Coordination) for a specific wireless communication device, and controls some functionality of the second radio base station 104 which is set to be a slave. When the wireless communication device 100 is connected to multiple radio base stations 102, 104, for some functionality, the radio base stations need to fulfil some time synchronisation requirements. Such time synchronisation requirements are also known as phase synchronisation requirements. For instance, radio base stations could be time synchronised in accordance with the PTP (Precision Time Protocol). A centrally arranged Grandmaster entity distributes PTP packets according to PTP IEEE (Institute of Electrical and Electronics Engineers) 1588v2, end to end, to PTP-clients, e.g. the radio base stations.

In this example the wireless communication device 100 is located in an area between the dash-dotted lines A and B, where the wireless communication device 100 will be served by the radio base stations 102, 104. This area will be centred in the middle between the radio base stations 102, 104. In order for functions to work properly radio base station 104 coverage must at least partly be within the area between the dotted lines A and B. The PTP synchronised signals from the master and slave radio base stations 102, 104 which reach the wireless communication device may not differ more than +/−750 ns from each other, giving a total of 1500 ns, which allows for a distance between A and B of about 450 meters. However, due to the time synchronisation requirements, wireless communication devices 100 may be located within coverage of two radio base stations 102, 104 but outside the lines A and B and could therefore not be properly served, which is a problem. A better time synchronization precision in the transport network part would allow for an increased difference between the radio signals from radio base stations 102, 104 to the wireless communication device 100 and thereby an increased distance between the dotted lines A and B. This increased area between dotted lines A and B will then cover further wireless communication devices 100

Thus, there is need for a more effective use of installed communication resources in communication networks.

SUMMARY

It would be desirable to obtain improved performance for services in communication networks. It is an object of this disclosure to address at least any of the issues outlined above.

Further, it is an object to provide a synchronisation module of a network node with functionality for determining paths of Synchronisation Master references and selecting an appropriate one of the determined paths. These objects may be met by a method and an arrangement according to the attached independent claims.

According to one aspect, a method is provided which is performed by a by a synchronisation report module of providing paths to a synchronisation module. The synchronisation report module is associated with a network node of a communication network, the communication network comprising at least one Synchronisation Master entity. The method comprises receiving a request for two paths of a first Synchronisation Master reference and two paths of a second Synchronisation Master reference from the synchronisation module. The two paths of the first Synchronisation Master reference extend between a Synchronisation Master entity of the first Synchronisation Master reference and respective ones of a first access network node and a second access network node. The two paths of the second Synchronisation Master reference extend between a Synchronisation Master entity of the second Synchronisation Master reference and the respective ones of a first access network node and a second access network node.

The method comprises further, in response to the received requests, determining the two paths of the first Synchronisation Master reference and the two paths of the second Synchronisation Master reference based on a PCE (Path Computation Engine), and sending the determined paths to the synchronisation module.

Furthermore, the method may comprise receiving a request for synchronisation characteristics related to the network node from the synchronisation module, obtaining the requested synchronisation characteristics, and sending the obtained synchronisation characteristics to the synchronisation module. The synchronisation characteristics may comprise any of: available synchronisation references at the network node, time delay values, jitter values, or asymmetry values of the network node, or of links associated to the network node. When sending the paths or synchronisation characteristics any of the following protocols may be applied: PTP (Precision Time Protocol, SDN (Software-Defined Networking), IS-IS (Intermediate System to Intermediate System), etc.

According to another aspect, a method is provided which is performed by a by a synchronisation module of determining a Synchronisation Master reference to be utilised by a first access network node and a second access network node. The synchronisation module is associated with a network node of a communication network which comprises at least one Synchronisation Master entity. The synchronisation module has knowledge of a plurality of Synchronisation Master references. The method comprises obtaining endpoints of paths of the plurality of Synchronisation Master references. Each of the paths extends between one of the at least one Synchronisation Master Entities and the first access network node or the second access network node. The method comprises also obtaining the paths from a synchronisation report module associated with a network node based on the obtained endpoints, and for each Synchronisation Master reference of the plurality of Synchronisation Master references: selecting a first path of the obtained paths, the first path extending between one of the at least one Synchronisation Master Entities and the first access network node; selecting a second path of the obtained paths, the second path extending between one of the at least one a Synchronisation Master entities and the second access network node; and calculating a time synchronisation inaccuracy value between the first access network node and the second access network node based on the selected first path and the selected second path. The method comprises further selecting a Synchronisation Master reference from the plurality of Synchronisation Master references based on the calculated time synchronisation inaccuracy values, and notifying the first access network node and the second access network node which Synchronisation Master reference of the plurality of Synchronisation Master reference that was selected.

Furthermore, the method may comprise obtaining one or more synchronisation characteristics from the synchronisation report module, and utilising the obtained one or more synchronisation characteristics when calculating the time synchronisation inaccuracy value. The one or more synchronisation characteristics are related to a network node associated to the synchronisation report module or other network nodes of the communication network. The synchronisation characteristics may be any of: available synchronisation references at a network node of the synchronisation report module, time delay values, jitter values, or asymmetry values of the network node of the synchronisation report module, or of links associated to the network node of the synchronisation report module.

According to further aspects, a synchronisation report module and synchronisation module, which are adapted to perform the method steps of any of the above described respective methods, are also provided. Both the synchronisation report module and the synchronisation module comprise a controller and a communication module arranged to perform actions of the respective methods. Furthermore, according to yet another aspect, a network node which comprises any of the synchronisation report module or the synchronisation module is also provided.

By arranging functionality in a communication network for determining paths along which Synchronisation Master references propagate, the Synchronisation Master references which currently provides the best synchronisation for a plurality of access network nodes may be determined and utilised by the access network nodes when serving wireless communication devices.

BRIEF DESCRIPTION OF DRAWINGS

The solution will now be described in more detail by means of exemplary embodiments and with reference to the accompanying drawings, in which.

DETAILED DESCRIPTION

There is a need for a solution which reduces synchronisation inaccuracy for access network nodes in communication networks.

By implementing functionality in a synchronisation module of a network node for obtaining paths of Master Synchronisation references from a synchronisation module of another network node, the synchronisation module is enabled to determine which Master Synchronisation reference that is the most appropriate for two access nodes serving a wireless communication device.

Within this description the term "synchronisation characteristics" will be used to denote any various aspects that affect phase synchronisation between various communication network nodes. Some examples of synchronisation characteristics are: delays for links between various communication nodes; jitter aspects, network topology (paths), etc.

In this description we will use the term "phase synchronisation" to denote how well two communication network nodes are synchronised in time. In literature the term phase synchronisation is sometimes also known as "time synchronisation".

Figure 2:
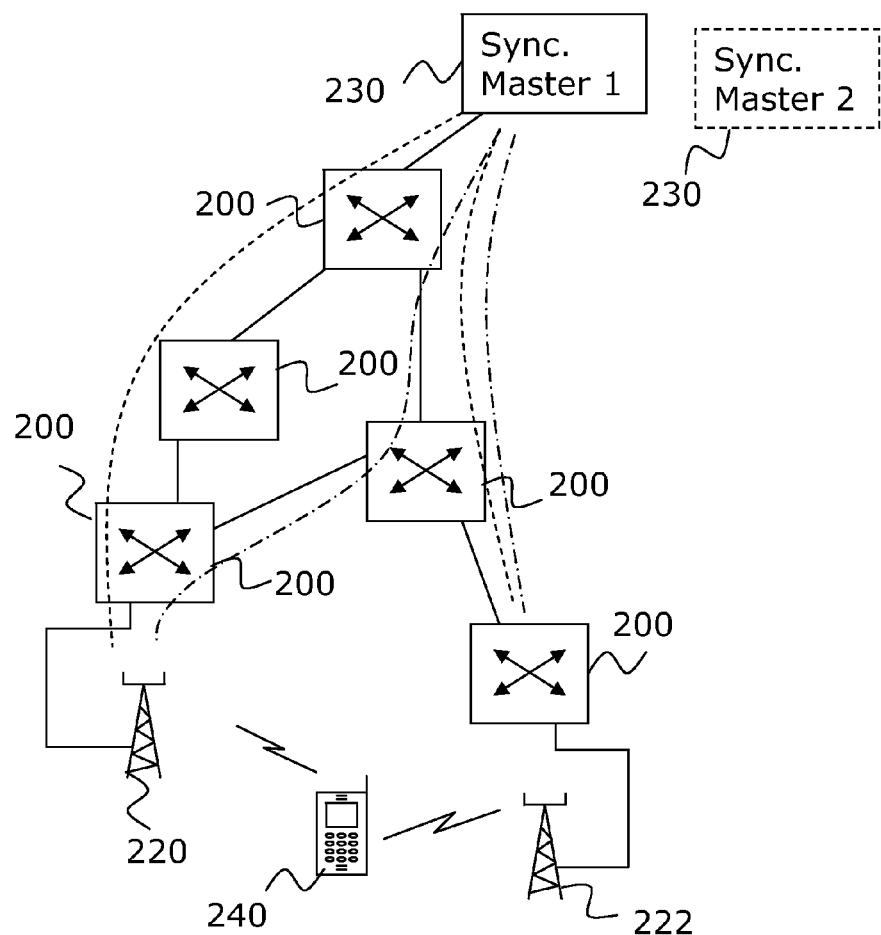
FIG. 2 is schematic block diagram of a scenario, according to possible embodiments.

With reference to FIG. 2, which is a schematic overview, a scenario of a communication network will now be described in accordance with one exemplifying embodiment.

The communication network comprises a transport network with a plurality of transport network nodes 200, e.g. suitable routers or gateways, an access network with radio base stations 220, 222 of any suitable radio access technology. For instance, any of the following radio access technologies: LTE (Long Term Evolution), LTE-Evolution, 5G (of 3GPP (Third Generation Partnership Program)), UMTS (Universal Mobile Technology System), or HSPA (High Speed Packet Access), etc. may be applied and appropriate radio base stations 220, 222 of the applied radio access technology are arranged. In the FIG. 2, a wireless communication device 240 according to the applied radio access technology is served by the two radio base stations 220, 222.

In the communication network there are two Synchronisation Master references available, by which the two radio base stations can be phase synchronised. Both the Synchronisation Master references originate from a first Synchronisation Master entity, 230. A first one of the Synchronisation Master references propagates from the first Synchronisation Master entity 230 along respective paths (marked with dashed lines) to the radio base stations 220, 222. Correspondingly, a second one of the Synchronisation Master references propagates from the first Synchronisation Master entity 230 along respective paths (marked with dash-dotted lines) to the radio base stations 220, 222. As indicated in the figure, the radio base stations 220, 222, are able to utilise any of the Synchronisation Master references when serving the wireless communication device. However, e.g. due to the fact that the Synchronisation Master references typically propagate along different paths, a more appropriate synchronisation may be achieved when selecting one of the Synchronisation Master references instead of the other one. Which one of the Synchronisation Master references that result in the most appropriate phase synchronisation, depends on various parameters. For instance, it depends on the topology of the communication network or synchronisation characteristics of the transport network nodes, or transport links between the transport network nodes. In this embodiment, the first Synchronisation Master reference propagates along the dashed paths, and the second Synchronisation Master reference propagates along the dash-dotted paths. The dashed paths split up already at the first transport node 200 after the Synchronisation Master Entity 230, when the dash-dotted paths split up after two transport nodes 200. Typically, applying the second Synchronisation Master reference (dash-dotted paths) result in a more appropriate synchronisation of the radio base stations 220, 222, due to less non-common transport network nodes 200 of the paths.

However, as said above there are further parameters which may affect synchronisation of the radio base stations 220, 222, e.g. various delays of transport network nodes 200 or links between, jitter values of the transport network nodes 200, and asymmetry values of the transport network nodes 200, etc.

This embodiment has been described for a simplified transport network in order to simplify the understanding. However, in practice the transport networks may typically be more complex and comprise a large number of transport network nodes. In addition, the Synchronisation Master references may originate from more than one Synchronisation Master entity 230 (illustrated as a dashed box in the FIG. 2), and each Synchronisation Master entity 230 may provide a plurality of Synchronisation Master references.

By determining and utilising the most appropriate Synchronisation Master reference, time inaccuracy synchronisation between the serving radio base stations will be decreased, which may result in that an increased number of wireless communication devices could be properly served by the radio base stations.

However, even if a specific Synchronisation Master reference is determined to be the most appropriate one for two radio base stations, it will not necessary be the most appropriate Synchronisation Master reference for two other radio base stations. This will be illustrated below.

Figure 3:
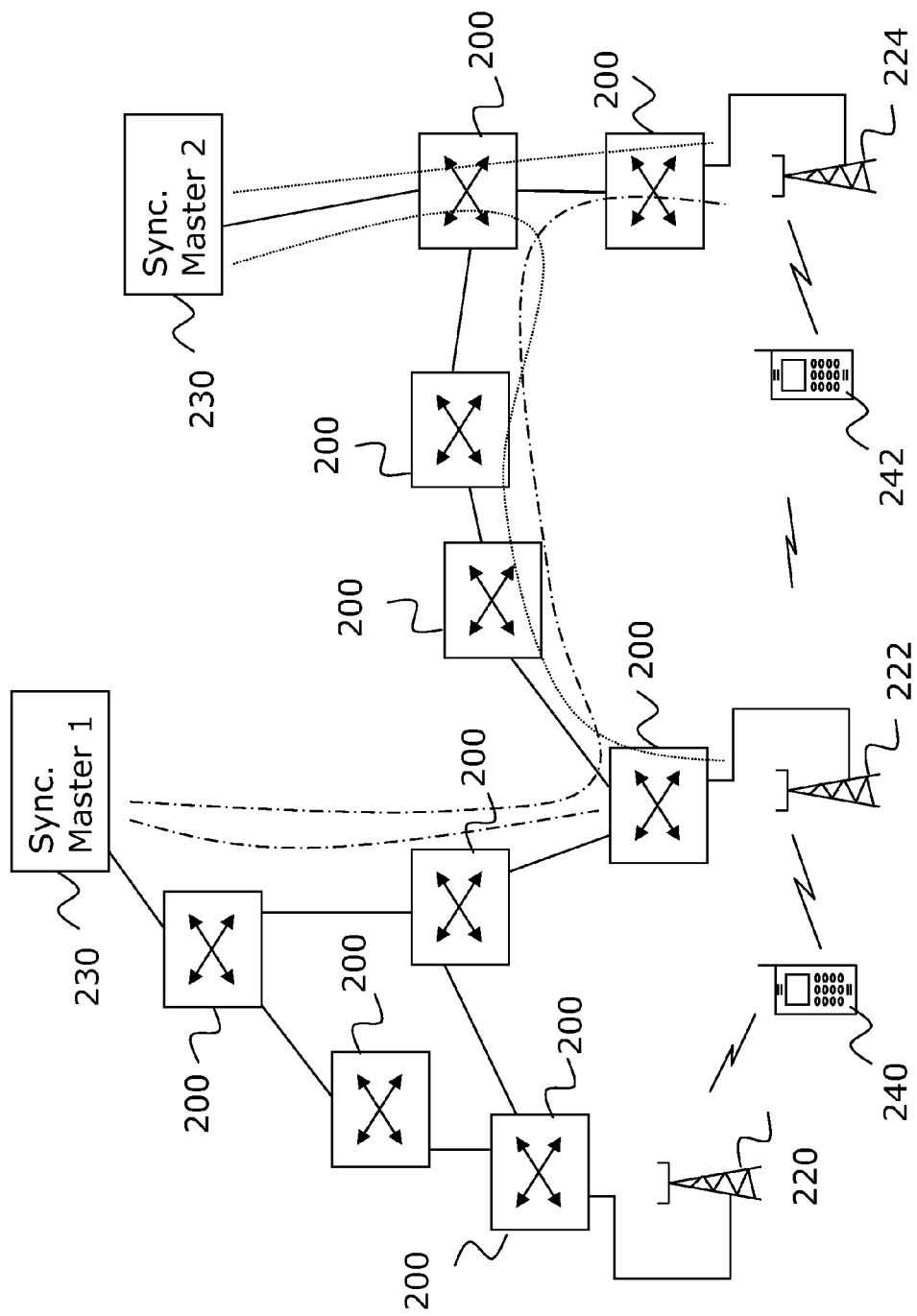
FIG. 3 is schematic block diagram of a scenario, according to possible embodiments.

With reference to FIG. 3, which is a schematic overview, a scenario of a communication network will now be described in accordance with one exemplifying embodiment.

This embodiment is based on the embodiments described in conjunction with FIG. 2 and the same reference numbers will therefore be applied when appropriate.

The transport network comprises further transport network nodes 200, and a second Synchronisation Master entity 230. The access network comprises a third radio base station 224, which serves a further wireless communication device 242 together with the second radio base station 222.

In the above described embodiment, it was determined that a second Synchronisation Master reference was the most appropriate one to utilise by the first and second radio base stations 220, 222 when serving the first wireless communication device. However, some radio base stations could be capable to utilise more than one Synchronisation Master reference at the same time, e.g. one Synchronisation Master reference could be used together with one specific radio base station and another Synchronisation Master reference could be utilised together with another specific radio base station.

The second Synchronisation Master entity 230 provides a third Synchronisation Master reference which propagates along dotted paths in the figure to the second and third radio base stations 222, 224. In this embodiment, when utilising the second Synchronisation Master reference (dash-dotted paths) there are 0 and 4 respective non-common transport network nodes 200 for the paths. When instead utilising the third Synchronisation Master reference (dotted paths) there are 3 and 1 respective non-common transport network nodes 200 for the paths, which may result in a more appropriate phase synchronisation of the second and third radio base stations 222, 224.

The following exemplifying embodiments will disclose some implementations of selecting the most appropriate Synchronisation Master reference for a pair of radio base stations which serve a wireless communication device. The embodiments define methods and arrangements of synchronisation report modules and synchronisation modules.

Figure 4:
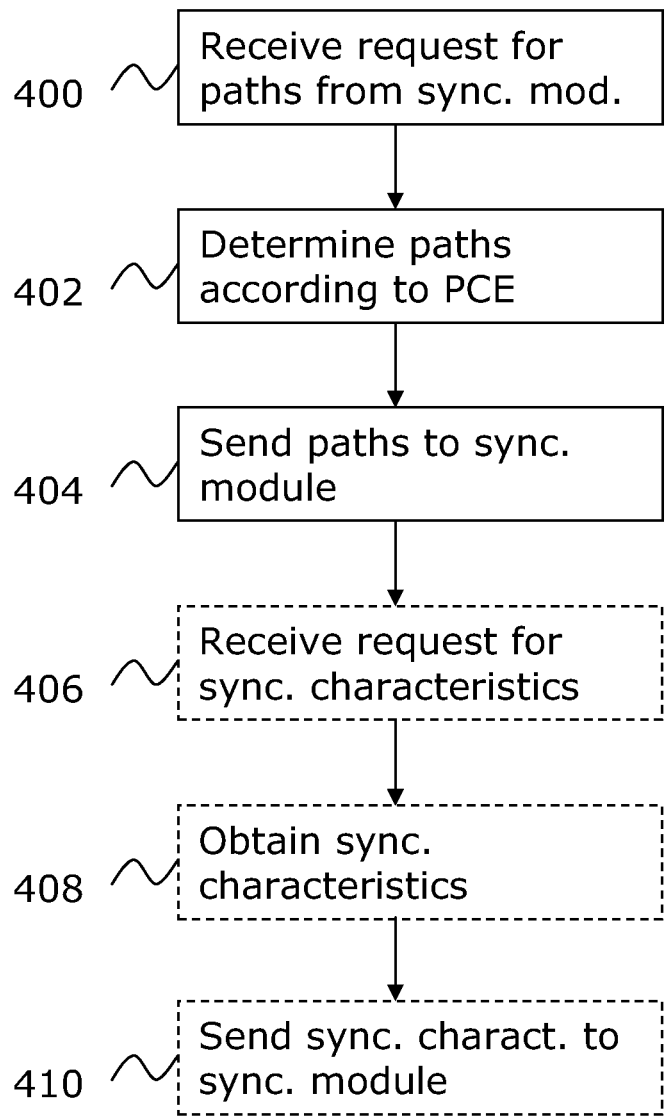
FIG. 4 is a schematic flow chart of a method, according to possible embodiments.

With reference to FIG. 4, which is a schematic flow chart, a method performed by a synchronisation report module will now be described in accordance with one exemplifying embodiment. The synchronisation report module is associated with a network node, such as a transport network node, an access network node, or a Synchronisation Master entity.

In a first action 400, the synchronisation report module receives a request for paths from a synchronisation module which is located in a network node of the communication network. The synchronisation module is arranged to determine and select an appropriate Synchronisation Master reference to utilise by two radio base stations. The request comprises endpoints of paths extending between a Synchronisation Master entity and the radio base stations. The endpoints are: IDs of the radio base stations, and Synchronisation Master IDs, i.e. identifications of the available Synchronisation Master references for the radio base stations.

In a following action 402, the synchronisation report module determines available paths between the received endpoints, by obtaining information regarding which transport network nodes that are passed for the different paths for applicable Synchronisation Master references from a PCE (Path Computation Engine). In this exemplifying embodiment the synchronisation report module determines the available paths from the PCE by utilising a routing protocol IS-IS (Intermediate System to Intermediate System). However, the disclosed concept is not limited to any specific protocol, and any other suitable PCE (Path computation Engine) may alternatively be applied instead, such as routing protocols like OSPF, including any offline PCE that calculates paths. Furthermore, in this exemplifying embodiment the Synchronisation Master references propagates by means of PTP (Precision Time Protocol) messages according to PTP IEEE (Institute of Electrical and Electronics Engineers) 1588v2, end to end, from a Synchronisation Master entity to PTP clients, i.e. the radio base stations. The announce messages of the PTP protocol allow the identification of the Synchronisation Master entities. The Domain number field of the Common Message header can be utilised to identify a specific Synchronisation Master reference flow. Alternatives methodologies can be defined, e.g. where paths for a specific synchronization flow are determined by the underlying networking protocol (e.g. VLAN (Virtual Local Area Network, IS-IS (Intermediate System to Intermediate System), SPB (Shortest Path Bridging), etc.).

In another action 404, the determined paths are sent to the synchronisation module for being utilised when selecting which one of the available Synchronisation Master references to be applied by the radio base stations.

Furthermore, the synchronisation module may base the selection of Synchronisation Master reference also on further synchronisation characteristics in order to achieve a more appropriate synchronisation.

Therefore, in a related exemplifying embodiment, which is based on the above described one, in an additional action 406, the synchronisation report module receives a request for further synchronisation characteristics from the synchronisation module, e.g. time delay values, jitter values, asymmetry values for the network nodes and links between the network nodes, etc.

In a following action 408, the synchronisation report module obtains the requested synchronisation characteristics from the control plane. In another action 410 the obtained synchronisation characteristics is sent to the synchronisation module.

In order to simplify the understanding, in the figure the actions 406-410 are illustrated as separate actions which are performed after the actions 400-404.

However, the concept is not limited thereto, instead the actions 406-410 may be performed simultaneously as the actions 400-404, or combined with the actions 400-404. For instance, the received request for paths of action 400 may in addition also relate to further synchronisation characteristics, etc.

Figure 5:
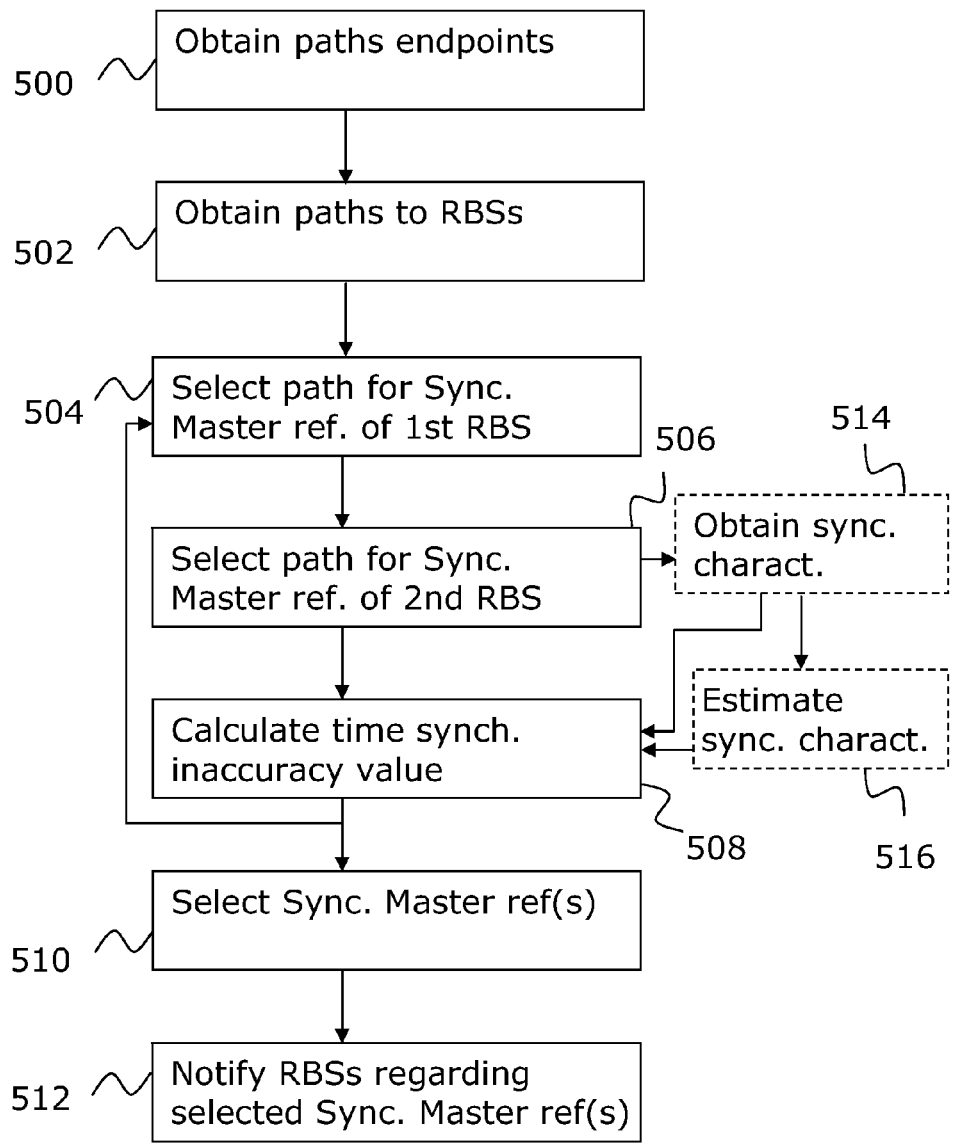
FIG. 5 is a schematic flow chart of a method, according to possible embodiments.

With reference to FIG. 5, which is a schematic flow chart, a method performed by a synchronisation module will now be described in accordance with one exemplifying embodiment. The synchronisation module is associated with a network node, such as a transport network node, an access network node, a PCE (Path Computation Engine), or a Synchronisation Master entity. In addition, the synchronisation module may be arranged distributed in a plurality of network nodes.

In a first action 500, the synchronisation module obtains endpoints of paths from the radio base stations. The endpoints are: IDs of the radio base stations, and Synchronisation Master IDs, i.e. identifications of the available Synchronisation Master references for the radio base stations.

In a following action 502, the paths are obtained by requesting a synchronisation report module for paths of the available Synchronisation Master references. The different paths are the ways which the Synchronisation Master references propagate from the Synchronisation Master entity(ies) to the radio base stations.

Then the synchronisation module performs the actions 504 and 506 for each of the Synchronisation Master references:

In a subsequent action 504, the synchronisation module selects one path to the first radio base station, and in another action 506, the synchronisation module selects one path to the second radio base station. In a following action 508, the synchronisation module calculates a time synchronisation inaccuracy value for that Synchronisation Master reference according to the selected paths. The synchronisation module then repeats the actions 504-508 for the next Synchronisation Master reference, and so on.

Figure 1:
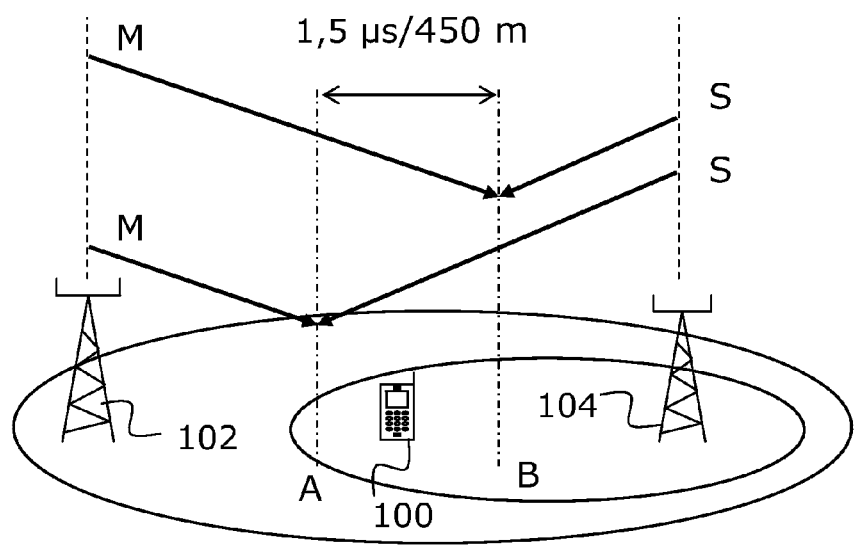
FIG. 1 is a schematic illustration of a situation in accordance with the existing art.

When the time synchronisation inaccuracy values of all available Synchronisation Master reference have been calculated, in a next action 510, the synchronisation module selects the Synchronisation Master reference which has the lowest time synchronisation inaccuracy value. In a final action 512, the synchronisation module notifies the appropriate radio base stations which Synchronisation Master reference that was selected. Thereby these radio base stations are enabled to utilise the most appropriate Synchronisation Master reference when serving wireless communication devices. Because inaccuracy of synchronisation may be decreased further wireless communication devices which are located more geographically spread might be properly served. Compared to the FIG. 1, the area between the lines A and B may be increased.

In a related exemplifying embodiment, which is based on the above described one, the appropriateness of the time synchronisation inaccuracy value may be increased further. In an additional action 514, which is performed after the actions 504 and 506, the synchronisation module obtains further synchronisation characteristics of the transport network nodes or links between the transport network nodes, i.e. links associated to the transport network nodes. These additional synchronisation characteristics will then be utilised as a further basis when calculating the time synchronisation inaccuracy values in the action 508. In addition, in a further action 516, the synchronisation characteristics for transport network node which synchronisation characteristics are unknown are estimated.

Figure 6:
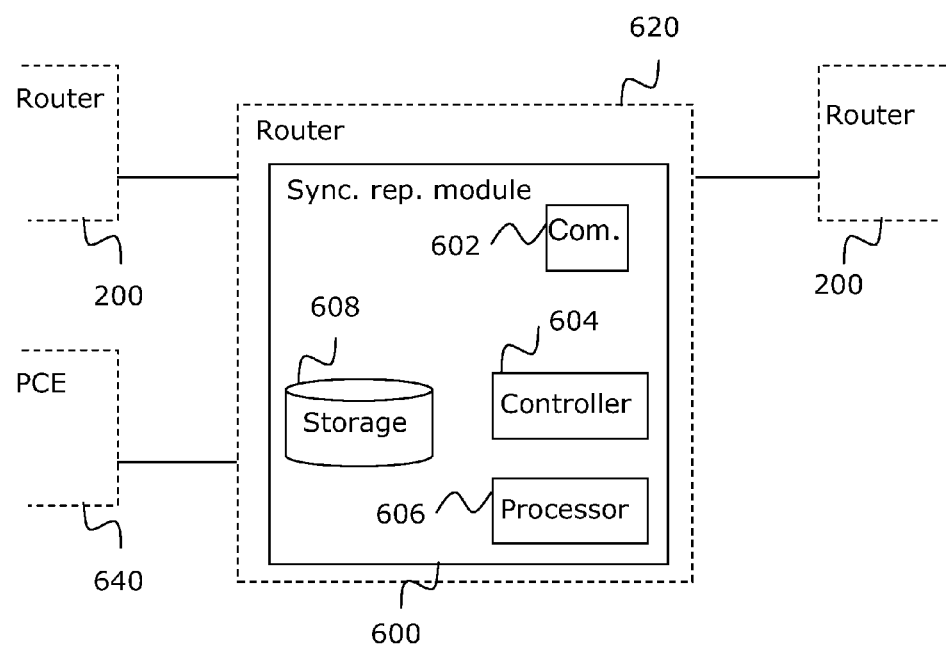
FIG. 6 is a schematic block diagram of an arrangement, according to possible embodiments.

With reference to FIG. 6, which is a schematic block diagram, a synchronisation report module 600, will now be described in accordance with one exemplifying embodiment. This embodiment refers also to FIG. 2 for some communication network nodes, and the same reference numbers will therefore be used when appropriate.

The synchronisation report module 600 is to be arranged in a network node, such as radio base station, a transport network node, a Synchronisation Master Entity, etc. In this embodiment the synchronisation report module 600 is arranged in a router 620 which is capable to connect be connected to other routers 200, but is not limited thereto. The synchronisation report module 600 may instead be arranged in any other suitable network node when appropriate. The synchronisation report module 600 is adapted to determine paths of Synchronisation Master references and further synchronisation characteristics and provide to a synchronisation module 700 (Not seen), e.g. arranged in a PCE (Path Computation Engine) 640.

The synchronisation report module 600 comprises a communication module 602, a controller 604, and optionally a processor 606 and a storage module 608.

The communication module 602 is adapted to receive a request for two paths of a first Synchronisation Master reference and two paths of a second Synchronisation Master reference from the synchronisation module 600. The two paths of the first Synchronisation Master reference extend between a Synchronisation Master entity 230 of the first Synchronisation Master reference and respective ones of two radio base stations 220, 222, 224, i.e. access network nodes. The two paths of the second Synchronisation Master reference extend between a Synchronisation Master entity 230 of the second Synchronisation Master reference and the respective ones of two radio base stations 220, 222, 224.

The controller 604 is adapted to determine the two paths of the first Synchronisation Master reference and the two paths of the second Synchronisation Master reference by a control plane according to a routing protocol, such as IS-IS (Intermediate System to Intermediate System). The communication unit 602 is further adapted to send the determined paths to the synchronisation module 700.

In a related exemplifying embodiment, which is based on the above described one, the synchronisation module 600 is further adapted to obtain further synchronisation characteristics and send to the synchronisation module 700. In this related embodiment the communication module 602 is further adapted to receive a request for further synchronisation characteristics of the network node, other network nodes or links between network nodes. The controller 604 is further adapted to obtain the requested synchronisation characteristics from the control plane. The communication module 702 is further adapted to send the obtained synchronisation characteristics to the synchronisation module 700.

It is to be noted that the disclosed concept is not limited to determine just two paths per Synchronisation Master reference. The above described solution may easily be modified for any suitable number of paths per Synchronisation Master reference. For instance, consider a wireless communication device which is served by three different radio base stations 220, 222, 224, the synchronisation report module could then be modified to obtain three paths per Synchronisation Master reference, i.e. one path extending to each one of the three radio base stations. In addition, the synchronisation report module 600 may receive and handle requests for Synchronisation Master references of different Synchronisation Master entities 230. These requests may be received in a sequence from the synchronisation module 700, or combined in the same request.

Optionally, the synchronisation report module 600 of the above described embodiments may comprise further components or units arranged to provide appropriate functionality. For instance, suitable processors 606 or storage units 608 may by arranged to provide improved calculation capacity, or storing paths or other synchronisation characteristics, etc.

Figure 7:
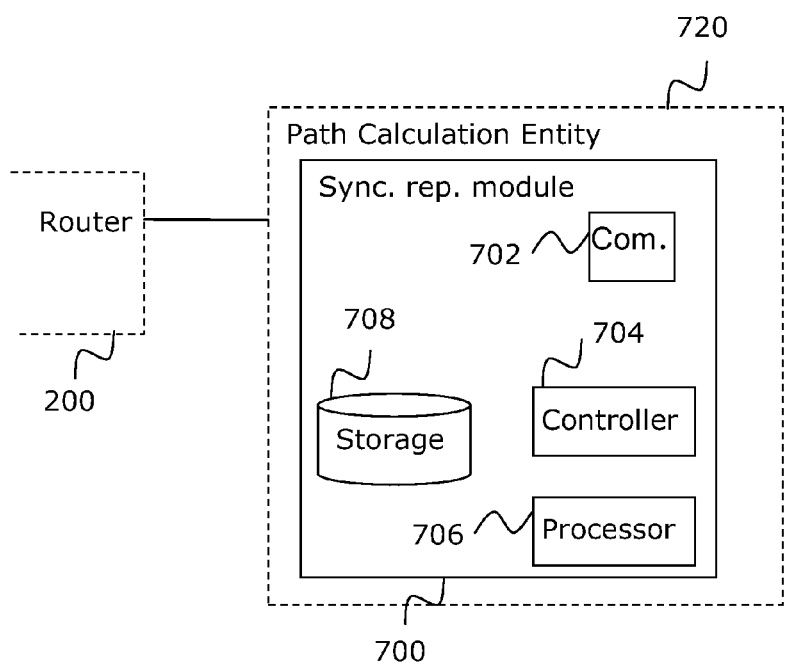
FIG. 7 is a schematic block diagram of an arrangement, according to possible embodiments.

With reference to FIG. 7, which is a schematic block diagram, a synchronisation module 700, will now be described in accordance with one exemplifying embodiment. This embodiment refers also to FIG. 2 for some communication network nodes, and the same reference numbers will therefore be used when appropriate.

The synchronisation module 700 is to be arranged in a network node, such as PCE (Path Computation Engine), a radio base station, a transport network node, a Synchronisation Master Entity, etc. In this embodiment the synchronisation module 700 is arranged in a PCE 720 in order to exchange synchronisation characteristics and paths with a synchronisation report module 600 of a router 200. However, the disclosed concept is not limited thereto. The synchronisation module 700 may be arranged in any suitable node of the communication network when appropriate. The synchronisation module 700 is adapted to select an appropriate Synchronisation Master reference to be applied by two radio base stations which serves a wireless communication device (not shown).

The synchronisation module 700 comprises a communication module 702, a controller 704, and optionally a processor 706 and a storage module 708.

The communication module 702 is adapted to obtain endpoints for paths of a plurality of available Synchronisation Master references. Each one of the paths extends between one Synchronisation Master Entity 230 and a first radio base station or a second radio base station. The communication module 602 is further adapted to obtain the paths from a synchronisation report module 600 (not shown) associated with a network node by sending the obtained endpoints and receiving the paths in response.

The controller 704 is adapted to select one of the available Synchronisation Master references. Before selecting one of the Synchronisation Master references, the controller 704 performs the following actions for each one of the Synchronisation Master references: selecting a first and a second one of the obtained paths, and calculating a time synchronisation inaccuracy value for that Synchronisation Master reference. A definition of paths has been made above in conjunction with another embodiment and will therefore not be further discussed in this embodiment.

The controller 704 is adapted to select the Synchronisation Master reference which has the lowest time synchronisation inaccuracy value.

The communication module 702 is further adapted to notify the first and second radio base stations which Synchronisation Master reference to utilise.

In another embodiment which is based on the above described one, the communication module 702 is further adapted to obtain further synchronisation characteristics from the synchronisation report module 600, as stated above in another embodiment. The controller 704 is further adapted to utilise these further synchronisation characteristics when calculating the time synchronisation inaccuracy value, and may then be enabled to increase appropriateness of the time inaccuracy values.

It is to be noted that the disclosed concept is not limited to determine just one Synchronisation Master reference per radio base station. The above described solution may easily be modified for any suitable number of Synchronisation Master reference per radio base station. For instance, consider the situation of FIG. 3, where the first radio base station 220 serves the wireless communication device 240 together with the second radio base station 222. In case that the second radio base station 222 in addition also serves the second wireless communication 242 together with the third radio base station 224, the second radio base station 222 will simultaneously utilise two different Synchronisation Master references.

In one exemplifying embodiment which is based on one above described embodiment, the synchronisation module 600 is adapted to determine different Synchronisation Master references for the radio base stations by repeating the procedure described above in conjunction with the FIG. 5 but for another pair of radio base stations.

Optionally, the synchronisation module 700 of the above described embodiments may comprise further components or units arranged to provide appropriate functionality. For instance, suitable processors 706 or storage units 708 may by arranged to provide improved calculation capacity, or storing paths or other synchronisation characteristics, etc.

Regarding some of the above described embodiments, the arrangements, nodes, and elements are schematically described and illustrated in order to simplify the understanding. However, a designer understands that the arrangements, nodes, and elements may be alternatively implemented within the disclosed concept when put into practice. For instance, any components and modules of one of the arrangements, nodes, or elements may be arranged in another arrangement, node, or element, or that further arrangements, nodes or elements may be arranged.

Figure 8:
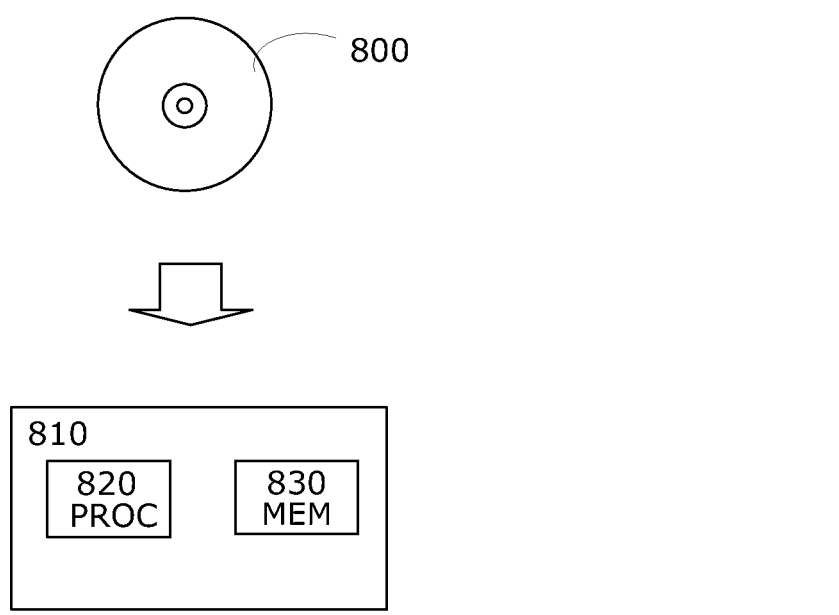
FIG. 8 is a schematic block diagram of a computer program product, according to possible embodiments.

According to some exemplifying embodiments, a computer program product comprises a computer readable medium such as, for example, a diskette or a CD-ROM (Compact Disc Read Only Memory) as illustrated by 800 in FIG. 8. The computer readable medium may have stored thereon a computer program comprising program instructions. The computer program may be loadable into a data-processing unit 830, which may, for example, be comprised in a communication network node 810. When loaded into the data-processing unit 830, the computer program may be stored in a memory 820 associated with or integral to the data-processing unit 830. According to some embodiments, the computer program may, when loaded into and run by the data-processing unit 830, cause the data-processing unit 830 to execute method steps according to, for example, the methods shown in the FIG. 4 or 5.

It is to be noted that the arrangements of the described exemplifying embodiments are described in a non-limiting manner. Typically, a designer may select to arrange further units and components to provide appropriate operation of the communication network node, within the described concept, e.g. further processors or memories. Moreover, physical implementations of the proposed arrangements may be performed alternatively within the disclosed concept. For instance, functionality of a specific illustrated unit or module may be implemented in another suitable unit or module when put into practice. The disclosed synchronisation report module and synchronisation module are also not limited to be implemented as specific physical nodes. A designer may select to implement corresponding synchronisation report functions, and synchronisation functions as virtual nodes in any suitable nodes which are connected to the communication network, within the disclosed concept.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a synchronisation report module for providing paths to a synchronisation module, the synchronisation report module being associated with a network node of a communication network, the communication network comprising at least one Synchronisation Master entity, the method comprising:

receiving a request for two paths of a first Synchronisation Master reference and two paths of a second Synchronisation Master reference from the synchronisation module, the two paths of the first Synchronisation Master reference extending between a Synchronisation Master entity of the first Synchronisation Master reference and respective ones of a first access network node and a second access network node and the two paths of the second Synchronisation Master reference extending between a Synchronisation Master entity of the second Synchronisation Master reference and the respective ones of the first access network node and the second access network node, in response to the received requests, determining the two paths of the first Synchronisation Master reference and the two paths of the second Synchronisation Master reference based on a Path Computation Engine (PCE), and sending the determined paths to the synchronisation module, the sent paths to be received by the synchronisation module for being utilised when selecting which one of the first Synchronisation Master reference and the second Synchronisation Master reference to be applied by the first access network node and the second access network node.

2. The method according to claim 1, further comprising receiving a request for synchronisation characteristics related to the network node from the synchronisation module, obtaining the requested synchronisation characteristics, and sending the obtained synchronisation characteristics to the synchronisation module.

3. The method according to claim 2, wherein obtaining the synchronisation characteristics comprises determining synchronisation characteristics from a set of available synchronisation references at the network node, time delay values, jitter values, or asymmetry values of the network node, or of links associated to the network node.

4. The method according to claim 2, wherein at least one of sending the determined paths, and sending the obtained synchronisation characteristics, is performed in accordance with a Precision Time Protocol (PTP) via the first access network node to the synchronisation module.

5. The method according to claim 2, wherein at least one of sending the determined paths, and sending the obtained synchronisation characteristics, is performed in accordance with a routing protocol or Software-defined Networking (SDN) protocol to the synchronisation module.

6. A synchronisation report module for providing paths to a synchronisation module, the synchronisation report module being associated with a network node of a communication network, the communication network comprising at least one Synchronisation Master entity, the synchronisation report module comprising:
  a communication unit adapted to receive a request for two paths of a first Synchronisation Master reference and two paths of a second Synchronisation Master reference from the synchronisation module, the two paths of the first Synchronisation Master reference extending between a Synchronisation Master entity of the first Synchronisation Master reference and respective ones of a first access network node and a second access network node, and the two paths of the second Synchronisation Master reference extending between a Synchronisation Master entity of the second Synchronisation Master reference and the respective ones of the first access network node and the second access network node, and
  a controller adapted to, in response to the received request, determine the two paths of the first Synchronisation Master reference and the two paths of the second Synchronisation Master reference based on a Path Computation Engine (PCE),
  the communication unit being further adapted to send the determined paths to the synchronisation module,
  such that the synchronisation module can receive the sent paths and utilise when selecting which one of the first Synchronisation Master reference and the second Synchronisation Master reference to be applied by the first access network node and the second access network node.

7. The synchronisation report module according to claim 6, wherein the communication unit is further adapted to receive a request for synchronisation characteristics related to the network node from the synchronisation module, obtain the requested synchronisation characteristics, and send the obtained synchronisation characteristics to the synchronisation module.

8. The synchronisation report module according to claim 7, wherein the controller is further adapted to obtain the synchronisation characteristics by determining synchronisation characteristics from a set of available synchronisation references at the network node, time delay values, jitter values, or asymmetry values of the network node, or of links associated to the network node.

9. The synchronisation report module according to claim 6, wherein the communication unit is adapted to send at least one of the determined paths, and the obtained synchronisation characteristics, in accordance with a Precision Time Protocol (PTP) to the synchronisation module.

10. The synchronisation report module according to claim 6, wherein the communication unit is adapted to send at least one of the determined paths, and the obtained synchronisation characteristics, in accordance with a routing protocol or Software-defined Networking (SDN) protocol to the synchronisation module.

11. A network node comprising a synchronisation report module, wherein the network node is one of an access network node, a transport network node, or a Synchronisation Master entity, wherein the synchronisation report module provides paths to a synchronisation module, the synchronisation report module being associated with a network node of a communication network, the communication network comprising at least one Synchronisation Master entity, the synchronisation report module comprising:
  a communication unit adapted to receive a request for two paths of a first Synchronisation Master reference and two paths of a second Synchronisation Master reference from the synchronisation module, the two paths of the first Synchronisation Master reference extending between a Synchronisation Master entity of the first Synchronisation Master reference and respective ones of a first access network node and a second access network node, and the two paths of the second Synchronisation Master reference extending between a Synchronisation Master entity of the second Synchronisation Master reference and the respective ones of the first access network node and the second access network node, and
  a controller adapted to, in response to the received requests, determine the two paths of the first Synchronisation Master reference and the two paths of the second Synchronisation Master reference based on a Path Computation Engine (PCE),
  the communication unit being further adapted to send the determined paths to the synchronisation module,
  such that the synchronisation module can receive the sent paths and utilise when selecting which one of the first Synchronisation Master reference and the second Synchronisation Master reference to be applied by the first access network node and the second access network node.

12. A method performed by a synchronisation module of determining a Synchronisation Master reference to be utilised by a first access network node and a second access network node, the synchronisation module being associated with a network node of a communication network which comprises at least one Synchronisation Master entity, the synchronisation module having knowledge of a plurality of Synchronisation Master references, the method comprising:
  obtaining endpoints of paths of the plurality of Synchronisation Master references, wherein each of the paths extends between one of the at least one Synchronisation Master entity and the first access network node or the second access network node,
  obtaining the paths from a synchronisation report module associated with the network node based on the obtained endpoints, for each Synchronisation Master reference of the plurality of Synchronisation Master references:
   selecting a first path of the obtained paths, the first path extending between one of the at least one Synchronisation Master Entities entity and the first access network node,
   selecting a second path of the obtained paths, the second path extending between one of the at least one Synchronisation Master entity and the second access network node, and
   calculating a time synchronisation inaccuracy value between the first access network node and the second access network node based on the selected first path and the selected second path, and
selecting a Synchronisation Master reference from the plurality of Synchronisation Master references based on the calculated time synchronisation inaccuracy values, and notifying the first access network node and the second access network node which Synchronisation Master reference of the plurality of Synchronisation Master references was selected.

13. The method according to claim 12, further comprising obtaining one or more synchronisation characteristics from the synchronisation report module, and utilising the obtained one or more synchronisation characteristics when calculating the time synchronisation inaccuracy values, the one or more synchronisation characteristics being related to the network node associated with the synchronisation report module or other network nodes of the communication network.

14. The method according to claim 13, wherein obtaining the synchronisation characteristics comprises obtaining synchronisation characteristics from a set of available synchronisation references at the network node associated with the synchronisation report module, time delay values, jitter values, or asymmetry values of the network node of the synchronisation report module, or of links associated with the network node associated with the synchronisation report module.

15. The method according to claim 12, wherein selecting the Synchronisation Master reference is further based on which communication network node that is a first common communication network node of the first path and the second path.

16. A synchronisation module for determining a Synchronisation Master reference to be utilised by a first access network node and a second access network node, the synchronisation module being associated with a network node of a communication network which comprises at least one Synchronisation Master entity, the synchronisation module having knowledge of a plurality of Synchronisation Master references, the synchronisation module comprising:
   a communication module adapted to obtain endpoints of paths of the plurality of Synchronisation Master references, wherein each of the paths extends between one of the at least one Synchronisation Master entity and the first access network node or the second access network node, and
   further adapted to obtain the paths from a synchronisation report module associated with a network node based on the obtained endpoints, and
   a controller adapted to, for each Synchronisation Master reference of the plurality of Synchronisation Master references:
     select a first path of the obtained paths, the first path extending between one of the at least one Synchronisation Master entity and the first access network node,
     select a second path of the obtained paths, the second path extending between one of the at least one Synchronisation Master entity and the second access network node, and
     calculate a time synchronisation inaccuracy value between the first access network node and the second access network node based on the selected first path and the selected second path, and
   further adapted to select a Synchronisation Master reference from the plurality of Synchronisation Master references based on the calculated time synchronisation inaccuracy values, and to notify the first access network node and the second access network node which Synchronisation Master reference of the plurality of Synchronisation Master references was selected.

17. The synchronisation module according to claim 16, wherein the communication module is further adapted to obtain one or more synchronisation characteristics from the synchronisation report module, and utilise the obtained one or more synchronisation characteristics when calculating the time synchronisation inaccuracy value, the one or more synchronisation characteristics being related to the network node associated with the synchronisation report module or other network nodes of the communication network.

18. The synchronisation module according to claim 17, wherein the communication module is further adapted to obtain the synchronisation characteristics by obtaining synchronisation characteristics from a set of available synchronisation references at the network node associated with the synchronisation report module, time delay values, jitter values, or asymmetry values of the network node associated with the synchronisation report module, or of links associated with the network node associated the synchronisation report module.

19. The synchronisation module according to claim 16, wherein the controller is adapted to select the Synchronisation Master reference further based on which communication network node that is a first common communication network node of the first path and the second path.

20. A network node comprising a synchronisation module, wherein the network node is one of an access network node, a transport network node, a Path Computation Engine (PCE), or a Synchronisation Master entity, wherein the synchronisation module is utilized for determining a Synchronisation Master reference to be utilised by a first access network node and a second access network node, the synchronisation module being associated with a network node of a communication network which comprises at least one Synchronisation Master entity, the synchronisation module having knowledge of a plurality of Synchronisation Master references, the synchronisation module comprising:
   a communication module adapted to obtain endpoints of paths of the plurality of Synchronisation Master references, wherein each of the paths extends between one of the at least one Synchronisation Master entity and the first access network node or the second access network node, and
   further adapted to obtain the paths from a synchronisation report module associated with a network node based on the obtained endpoints, and
   a controller adapted to, for each Synchronisation Master reference of the plurality of Synchronisation Master references:
     select a first path of the obtained paths, the first path extending between one of the at least one Synchronisation Master entity and the first access network node, select a second path of the obtained paths, the second path extending between one of the at least one Synchronisation Master entity and the second access network node, and calculate a time synchronisation inaccuracy value between the first access network node and the second access network node based on the selected first path and the selected second path, and further adapted to select a Synchronisation Master reference from the plurality of Synchronisation Master references based on the calculated time synchronisation inaccuracy values, and to notify the first access network node and the second access network node which Synchronisation Master reference of the plurality of Synchronisation Master references was selected.

21. A non-transitory machine-readable storage medium having computer code stored therein, which when executed by a set of one or more processors of a synchronisation report module for providing paths to a synchronisation module, the synchronisation report module being associated with a network node of a communication network, the communication network comprising at least one Synchronisation Master entity, causes the synchronisation report module to perform operations comprising:

receiving a request for two paths of a first Synchronisation Master reference and two paths of a second Synchronisation Master reference from the synchronisation module, the two paths of the first Synchronisation Master reference extending between a Synchronisation Master entity of the first Synchronisation Master reference and respective ones of a first access network node and a second access network node, and the two paths of the second Synchronisation Master reference extending between a Synchronisation Master entity of the second Synchronisation Master reference and the respective ones of the first access network node and the second access network node, in response to the received requests, determining the two paths of the first Synchronisation Master reference and the two paths of the second Synchronisation Master reference based on a Path Computation Engine (PCE), and sending the determined paths to the synchronisation module, the sent paths to be received by the synchronisation module for being utilised when selecting which one of the first Synchronisation Master reference and the second Synchronisation Master reference to be applied by the first access network node and the second access network node.

\* \* \* \* \*